United States Patent [19]

Kimata et al.

[11] Patent Number: 4,747,803
[45] Date of Patent: May 31, 1988

[54] TRIPOD HOMOKINETIC UNIVERSAL JOINT WITH CYLINDRICAL ROLLERS AND A FLAT ROLLER GUIDE

[75] Inventors: Kei Kimata, Ama; Masahiro Kato; Fumio Hoshikawa, both of Iwata; Hisashi Takahashi, Takarazuka, all of Japan

[73] Assignee: NTN Toyo Bearing Co., Ltd., Osaka, Japan

[21] Appl. No.: 907,912

[22] Filed: Sep. 16, 1986

[30] Foreign Application Priority Data

Sep. 17, 1985 [JP] Japan .................. 60-141669[U]

[51] Int. Cl.⁴ ................................................. F16D 3/20
[52] U.S. Cl. ..................................... 464/111; 464/905
[58] Field of Search ............... 464/111, 122, 123, 124, 464/132, 905

[56] References Cited

U.S. PATENT DOCUMENTS

| | | | |
|---|---|---|---|
| 3,818,721 | 6/1974 | Wahlmark | 464/111 |
| 3,975,922 | 8/1976 | Orain | 464/123 |
| 4,192,154 | 3/1980 | Nakamura et al. | 464/111 |
| 4,512,750 | 4/1985 | Orain | 464/111 |
| 4,604,077 | 8/1986 | Orain | 464/111 |

FOREIGN PATENT DOCUMENTS

| | | | |
|---|---|---|---|
| 2831044 | 10/1979 | Fed. Rep. of Germany | 464/111 |
| 1352259 | 1/1964 | France | 464/111 |
| 55-36614 | 3/1980 | Japan | 464/111 |

Primary Examiner—Daniel P. Stodola
Attorney, Agent, or Firm—Armstrong, Nikaido, Marmelstein & Kubovcik

[57] ABSTRACT

A tripod type homokinetic universal joint which has a tripod member formed with three trunnions, an outer member formed with three track grooves to receive the trunnions, and a cylindrical roller mounted on each trunnion. Each track groove has a pair of roller guide surfaces which are flat and parallel to a plane including the axis of the outer member and the center of the track groove. A ring is interposed between each cylindrical roller and each trunnion and is supported so as to be turnable around an axis which is perpendicular to the axis of the trunnion and parallel to the axis of the tripod member.

6 Claims, 5 Drawing Sheets

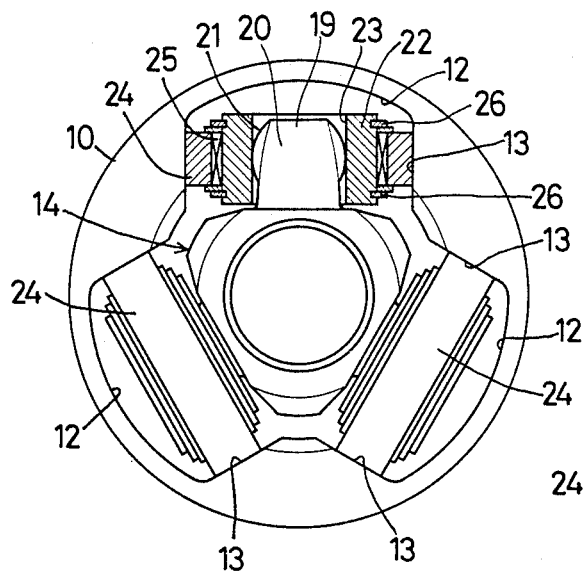
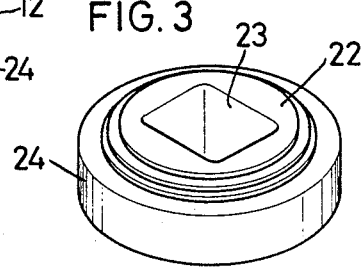
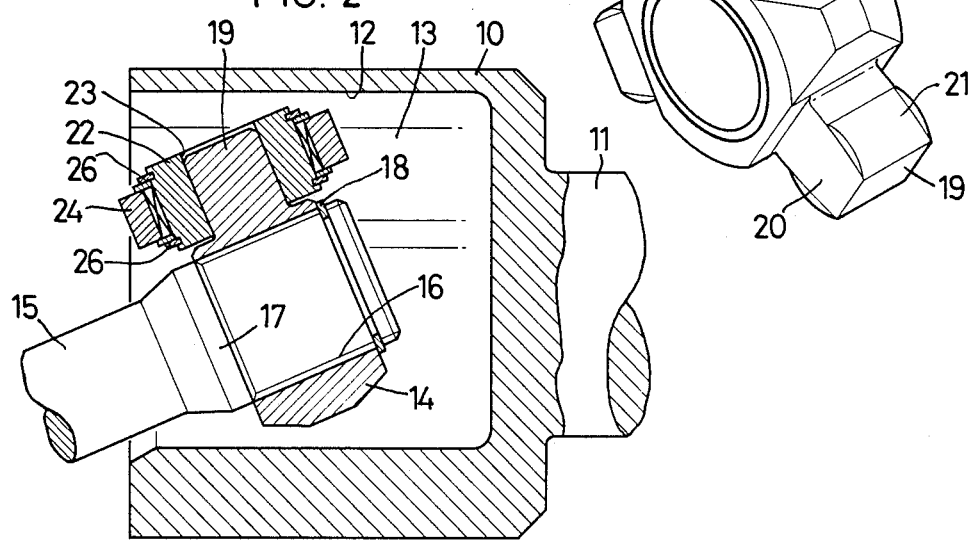

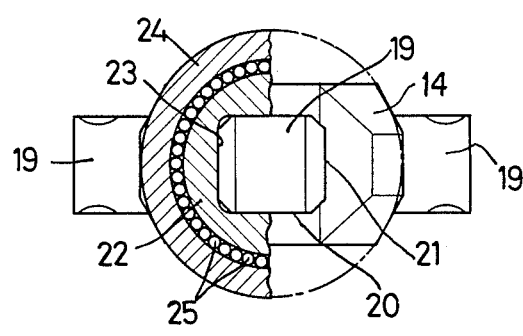
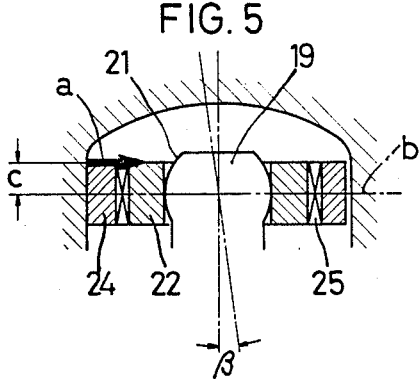
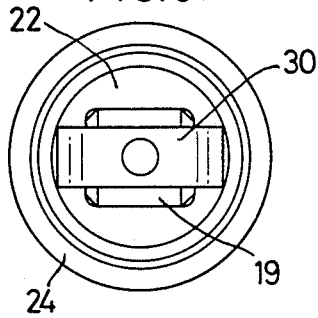
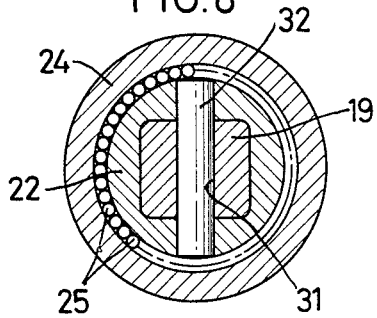
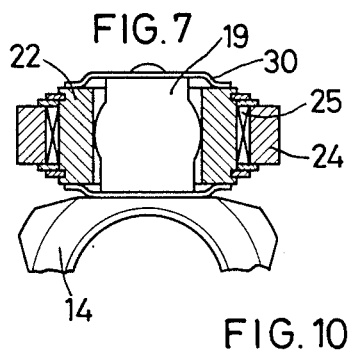
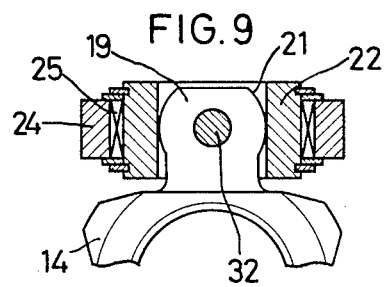
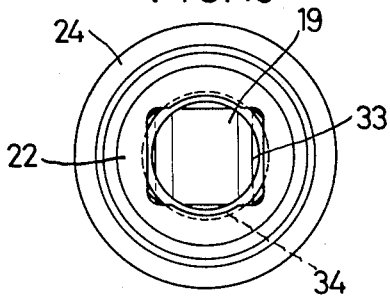
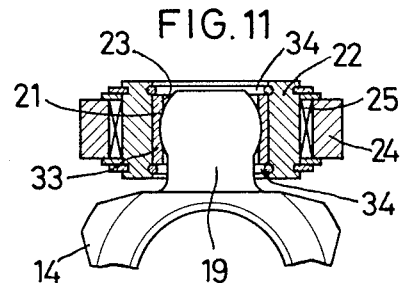

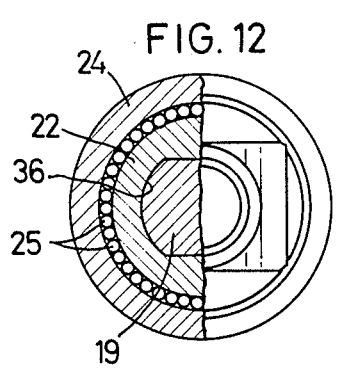
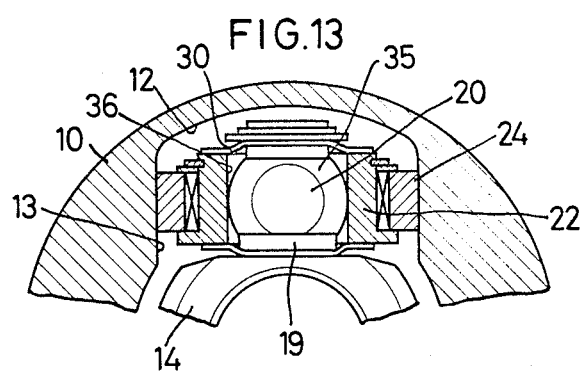
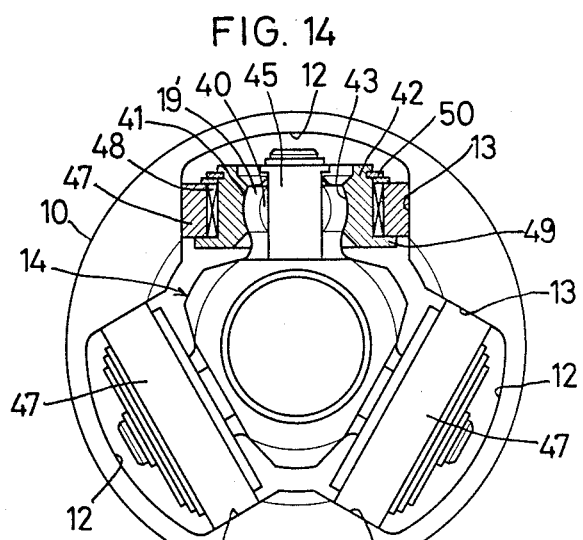
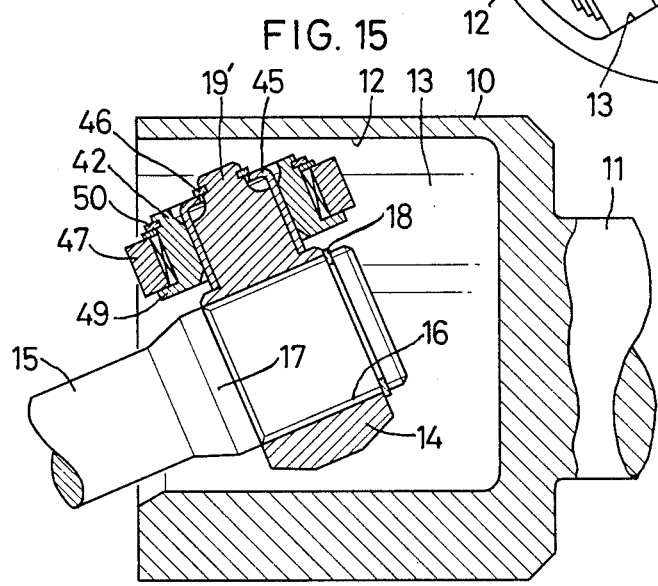

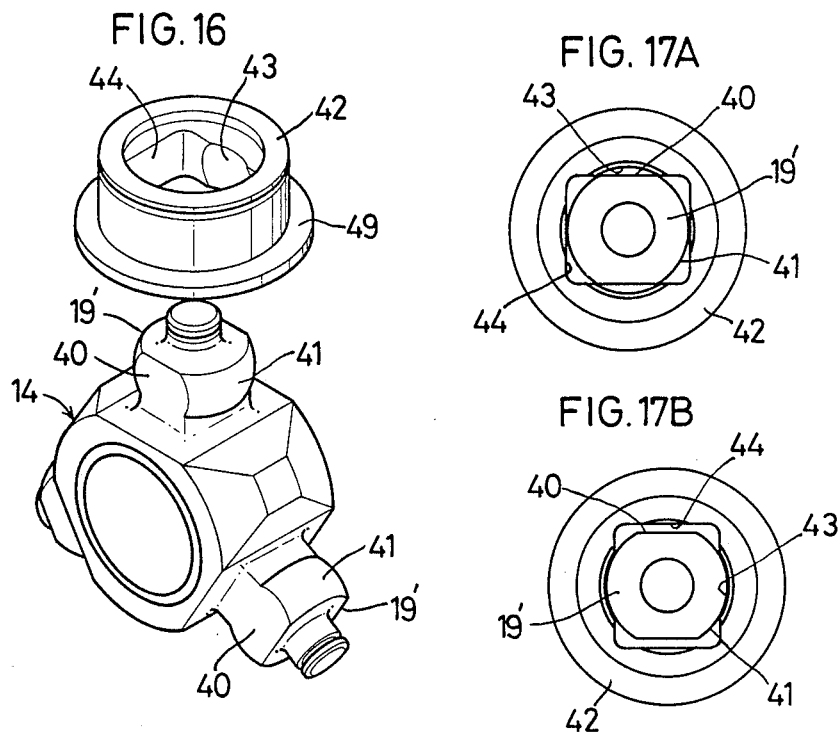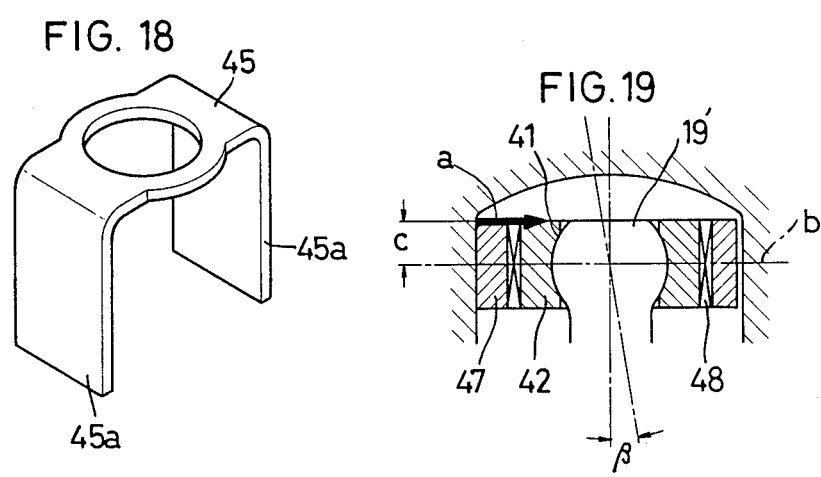

TRIPOD HOMOKINETIC UNIVERSAL JOINT WITH CYLINDRICAL ROLLERS AND A FLAT ROLLER GUIDE

BACKGROUND OF THE INVENTION

The present invention relates to a homokinetic universal joint used mainly for front wheel drive vehicles, and particularly to a tripod type homokinetic universal joint.

FIG. 21 is a prior art homokinetic universal joint which has an outer member 1 formed in its inner surface with three axially extending cylindrical track grooves 2, a tripod member 3 inserted into the outer member 1 and formed with three radially extending trunnions 4, which are received in the respective cylindrical track grooves 2, and a spherical roller 5 rotatably and axially slidably mounted on each trunnion 4 so as to engage on roller guide surfaces 6 formed at each side of the track groove 2.

In such a known tripod type universal joint, when a turning effort is transmitted with some working angle formed between the outer member 1 and the tripod member 3, each spherical roller 5 is oblique with respect to the roller guide surface 6 in the track groove 2, as shown in FIGS. 21 and 22, so that the roller 5 cannot do a normal rolling motion. In more detail, the spherical roller 5 tends to roll in the direction of the arrow in FIG. 21, but, since the track groove 2 is cylindrical and parallel to the axis of the outer member 1, the movement of roller 5 is governed by the track groove 2. This causes a slippage between the roller roller 5, and the slippage causes the temperature to rise, an axial thrust roller 5, and the slip causes temperature rise, axial thrust and vibration.

The inventors of the present invention ascertained that the abovesaid problem results from the combination of a spherical roller with a cylindrical groove. They investigated various arrangements to solve this problem, and proposed using a cylindrical roller rolling on flat roller guide surfaces, considering that a cylindrical roller can roll on a flat guide surface without suffering restriction. However, the arrangement having a cylindrical roller merely mounted on each trunnion of the tripod member will not function as a universal joint due to the fact that interference happens between the outer periphery of the cylindrical roller and the roller guide surfaces on the track groove when some working angle is formed between the shaft of the outer member and that of the tripod member.

As shown in FIG. 20, when some working angle is formed between the tripod member 3 and the outer member in a plane including roller 5C on one (4C) of the trunnions 4 and the axis O of the outer member, the axis of the tripod member 3 shifts from the axis O of the outer member to a point O'. The axis O' of the tripod member 3 tends to turn around the axis O of the outer member with a radius r. In this state, the other two trunnions 4a, 4b form an angle γ in comparison with the state when no working angle is formed. Thus, the rollers 5a and 5b mounted on these trunnions 4a and 4b will take a position as shown in FIG. 20 by the dotted lines and will get stuck between the roller guide surfaces 6, so that this arrangement can not function as a universal joint.

SUMMARY OF THE INVENTION

An object of the present invention is to provide improved tripod type homokinetic universal joints which obviate the aforesaid shortcomings.

In accordance with the present invention, the roller guide surfaces formed at both sides of the track grooves formed in the inner surface of the outer member are flat and parallel to a plane including the axis of the outer member and the center of the track groove; the roller mounted on the trunnion is cylindrical; and a ring is interposed between the cylindrical roller and the trunnion and is supported so as to be turnable around an axis which is perpendicular to the axis of the trunnion and parallel to the axis of the tripod member.

With the homokinetic universal joint according to the present invention, rotation is transmitted by engagement between the rollers and the roller guide surfaces on the outer member as in the conventional joint of this type. Also, any relative plunging between the outer member and the tripod member is absorbed by the rolling of the cylindrical rollers on and along the roller guide surfaces.

When the working angle between the shaft of the outer member and that of the tripod member is zero, since the axes of the three trunnions meet with one another at a point aligned with the axis of the outer member, the cylindrical rollers are maintained in a line-to-line contact with the roller guide surfaces. Thus, no force tending to turn the ring acts on the ring.

When the rotation is transmitted with some working angle between them, the axes of three trunnions meet with one another at a point which is at some distance from the axis of the outer member, the point of intersection turning around the axis of the outer member with a radius equal to the abovesaid distance. With such a movement, each trunnion gets out of alignment with the respective track groove, so that the contact of the cylindrical roller with the roller guide surfaces tends to change from line-to-line contact to point-to-point contact. As a result, the cylindrical rollers receive a reaction force from the roller guide surfaces in a nonuniform manner, tending to turn the ring. The ring will turn by a required angle depending on the degree of misalignment of the trunnion in the track groove, thus absorbing any interference between the cylindrical roller and the roller guide surfaces. The present invention ensures that the outer periphery of the cylindrical rollers are kept in a line-to-line contact with the roller guide surfaces. Thus, the cylindrical rollers can roll smoothly along the roller guide surfaces without causing any heat build-up or vibration even if there is some working angle.

Other features and advantages of the present invention will become apparent from the following description taken with reference to the accompanying drawings.

BRIEF DESCRIPTION OF THE DRAWINGS

FIG. 1 is a vertical sectional front view of the first embodiment;

FIG. 2 is a vertical sectional side view thereof;

FIG. 3 is an exploded view of the tripod member, ring and cylindrical roller used therein;

FIG. 4 is a partially cutaway top plan view showing how the cylindrical roller is supported;

FIG. 5 is a view showing how the cylindrical roller acts on the ring;

FIG. 6 is a plan view showing how the ring and the cylindrical roller are mounted in the second embodiment;

FIG. 7 is a vertical sectional front view thereof;

FIG. 8 is a horizontal sectional plan view showing how the ring and the cylindrical roller are mounted in the third embodiment;

FIG. 9 is a vertical sectional front view thereof;

FIG. 10 is a plan view showing how the ring and cylindrical roller are mounted in the fourth embodiment;

FIG. 11 is a vertical sectional front view thereof;

FIG. 12 is a partially cutaway plan view of the fifth embodiment;

FIG. 13 is a vertical sectional front view thereof;

FIG. 14 is a view similar to FIG. 1 of a fifth embodiment;

FIG. 15 is a view similar to FIG. 2 of the same;

FIG. 16 is a view similar to FIG. 3 of the same;

FIG. 17A and 17B are plan views showing how the ring is mounted on the trunnion in the fifth embodiment;

FIG. 18 is a perspective view of the retainer member used in the fifth embodiment;

FIG. 19 is a view similar to FIG. 5 of the fifth embodiment;

DETAILED DESCRIPTION OF THE PREFERRED EMBODIMENT

Figure 20:
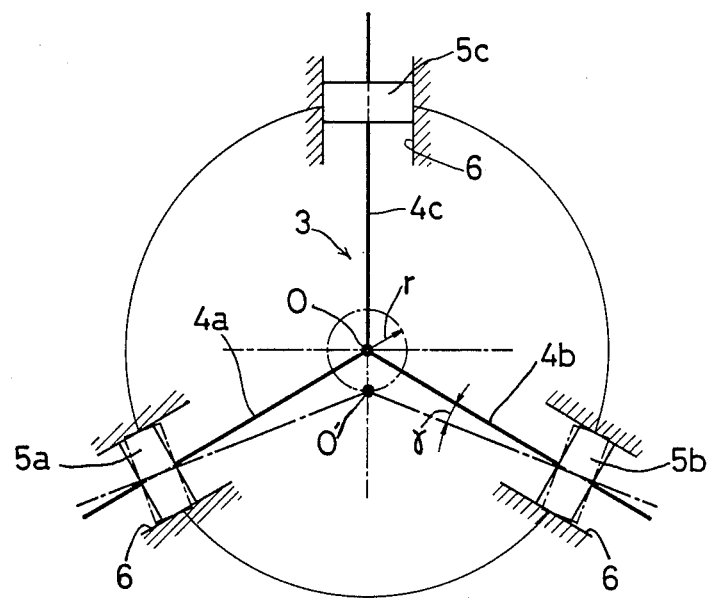
FIG. 20 is a schematic view for explaining the problem to be solved by the present invention.
Figure 21:
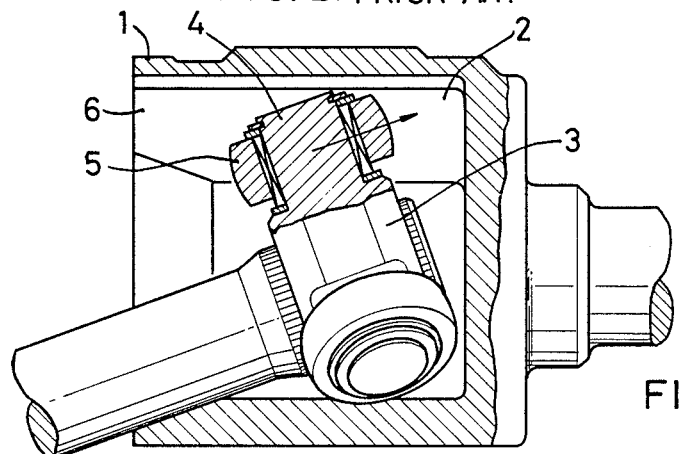
FIG. 21 is a vertical sectional side view of a conventional joint.
Figure 22:
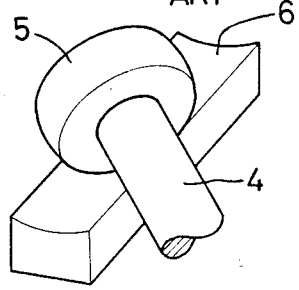
FIG. 22 is a perspective view showing how the spherical roller rolls on the roller guide surface on the conventional joint of FIG. 21.

Referring to FIGS. 1-3, an outer member 10 has a first shaft 11 integrally formed at its closed end. It is formed in its inner periphery with three axially extending track grooves 12 equally spaced apart 120 degrees around its axis. Each track groove 12 has at each side one roller guide surface 13 which is flat and parallel to the plane including the axis of the outer member 10 and the center of the track groove 12.

A tripod member 14 to be inserted into the outer member 10 is engaged on a serration 16 formed on one end of a second shaft 15 and securely retained between an enlarged portion 17 and a clip 18. The tripod member 14 has three trunnions 19, each of which has a pair of flat surfaces 20 which are parallel to a plane perpendicular to the axis of the tripod member 14, and a cylindrical surface 21 having its axis parallel to the axis of the tripod member 14. (FIG. 3) A ring 22 having a square hole 23 is mounted on each trunnion 19. One of the two opposed pairs of inner surfaces of the square hole 23 engage the flat surfaces 20 on each trunnion 19 whereas the other contact the cylindrical surface 21 in a line. Thus, the ring 22 does not move in the direction of axis of the tripod member 14, but can turn along the cylindrical surface 21.

A cylindrical roller 24 is mounted on the ring 22 with a plurality of rolling members 25 interposed between the ring 22 and the cylindrical roller 24. The latter is retained in position by stop rings 26 secured to opposite ends of the ring 22.

Next, it will be described how the embodiment shown in FIGS. 1-3 operates. When the working angle between the first shaft 11 and the second shaft 15 is zero, the rotation of one of them is transmitted to the other through the cylindrical roller 24 engaging the roller guide surfaces 13 on the track groove 12. If one of the two shafts plunges toward the other during the relative movement between them, the cylindrical rollers 24 will turn around the rings 22 and roll on and along the flat roller guide surfaces 13 on the track grooves 12. The outer periphery of each cylindrical roller 24 contacts the roller guide surfaces 13 in a line and the roller 24 is given a reaction force uniformly on the line of contact. Thus, no force tending to turning the ring 22 acts thereon.

When some working angle is formed between the first shaft 11 and the second shaft 15, the trunnions 19 are liable to run out as shown in FIG. 20 while turning around the axis of the second shaft 15. Now, due to the runout, the contact of the cylindrical roller 24 with the roller guide surfaces 13 will tend to change from a line-to-line contact to a point-to-point contact, so that the reaction force from the roller guide surfaces 13 to the cylindrical roller 24 is not applied uniformly but at one point as shown in FIG. 5 by arrow a. The point is away by a distance c from a plane b which is perpendicular to the axis of the trunnion 19 and includes the axis of the cylindrical surface 21. Thus, the ring 22 receives a force tending to turn it around the axis of the cylindrical surface 21, thus turning by an angle of $\beta$ to absorb the reaction force. The cylindrical roller 24 turns along the roller guide surfaces 13 which are flat.

In the embodiment of FIGS. 1-3, the ring 22 is mounted on each trunnion 19 so as to be movable axially. It may be mounted so as not to be movable axially.

In the embodiment of FIGS. 6 and 7, that of FIGS. 8 and 9, and that of FIGS. 10 and 11, the ring 22 is mounted so as not to be movable axially.

In the embodiment of FIGS. 6 and 7, a plate spring 30 is secured to each end of the trunnion 19, and has each end thereof engaging the ends of the ring 22 to prevent the ring from coming off.

In the embodiment of FIGS. 8 and 9, a pin 32 passes through a hole 31 extending radially through the trunnion 19 and the ring 22 so as for the ring to be turnable around the pin 32. In case of this arrangement, if the fit of the pin 32 in the hole 31 of the trunnion 19 is loose, the cylindrical surface 21 will be the pressure receiving surface. If the fit of the cylindrical surface 21 of the trunnion 19 in the hole 23 of the ring 22 is loose, the pin 32 will be the pressure receiving member.

In the embodiment of FIGS. 10 and 11, a spacer seat 33 is interposed between the trunnion 19 and the ring 22 and is retained in position by stop rings 34 secured to both ends of the ring 22.

FIGS. 12 and 13 show another embodiment of a homokinetic universal joint. In this embodiment, each trunnion 19 is formed with a toroid surface 35 and a pair of flat surfaces 20 parallel to a plane perpendicular to the axis of the tripod member 14. The ring 22 is mounted on the trunnion 19 and has a hole 23 formed with a cylindrical surface 36 so as to be complementary with the toroid surface 35 and have its center aligned with the axis of the trunnion 19.

In this embodiment, too, when the working angle is zero, there is no force tending to turn the ring 22 around a straight line parallel to the axis of the tripod member 14. When some working angle is formed, such a force tending to turn the ring 22 is produced, causing the ring to turn around the straight line for a certain angle to absorb the interference with the roller guide surfaces 13.

Referring to FIGS. 14-19 showing the fifth embodiment, an outer member 10 has a first shaft 11 integrally formed at its closed end. It is formed in its inner periphery with three axially extending track grooves 12 equally spaced apart 120 degrees around its axis. Each track groove 12 has at each side one roller guide surface 13 which is flat and parallel to the plane including the axis of the outer member 10 and the center of the track groove 12.

A tripod member 14 to be inserted into the outer member 10 is engaged on a serration 16 formed on one end of a second shaft 15 and securely retained between an enlarged portion 17 and a clip 18. The tripod member 14 has three trunnions 19', each of which has a spherical surface 41 and a pair of flat surfaces 40 which are parallel to a plane perpendicular to the axis of the tripod member 14.

A ring 42 adapted to be mounted on each trunnion 19' has an opposed pair of concave surfaces 43 and an opposed pair of flat surfaces 44. When the ring 42 is mounted on the trunnion 19', the concave surfaces 43 face the spherical surface 41 on the trunnion 19' whereas the flat surfaces 44 face the flat surfaces 40 on the trunnion 19'. Thus, the ring 42 cannot move in the direction of axis of the tripod member 14, but can turn along the spherical surface 41 on the trunnion 19'.

The legs 45a of a retainer 45 (FIG. 18) are interposed between the flat surfaces 40 on each trunnion 19' and the flat surfaces 44 on the ring 42 so that the ring 42 can turn only in the plane including the axes of the three trunnions 19'. The retainer 45 is prevented by a stop ring 46 from coming off. A cylindrical roller 47 is mounted on the ring 42 with rolling members 48 interposed therebetween. The cylindrical roller 47 is retained in position between a flange 49 of the ring 42 and a stop ring 50.

It will be described below how to mount the ring 22 on each trunnion 19' with reference to FIGS. 16-18. As shown in FIG. 16, the ring 42 is firstly mounted on the trunnion 19' so that the flat surfaces 44 on the ring 42 will face the spherical surfaces 41 on the trunnion 19' and the concave surfaces 43 on the ring 42 will face the flat surfaces 40 on the trunnion 19'. The ring 42 is then turned by 90 degrees around the axis of the trunnion until the flat surfaces 44 on the ring 42 meet the flat surfaces 40 on the trunnion 19' and the concave surfaces 43 on the ring 42 get on the spherical surfaces 41 on the trunnion. The retainer 45 is then set with its legs 45a inserted between the flat surfaces 44 on the ring 42 and the flat surfaces 40 on the trunnion 19' so that the ring 42 can turn only in the plane including the axes of the three trunnions 19'.

The operation of the further embodiment will be described below. When the working angle between the first shaft 11 and the second shaft 15 is zero, the rotation is transmitted through the cylindrical roller 47 engaging the roller guide surfaces 13 on the track groove 12. If one of the two shafts plunges toward the other during the relative movement between them, the cylindrical rollers 47 will turn around the rings 42 and roll on and along the flat roller guide surfaces 13 on the track grooves 12. At that time, the outer periphery of each cylindrical roller 47 contacts the roller guide surfaces 13 in a line and the roller 47 is given a reaction force uniformly on the line of contact. Thus, no force tending to turning the ring 42 acts thereon.

When some working angle is formed between the first shaft 11 and the second shaft 15, the trunnions 19' are liable to run out as shown in FIG. 20 while turning around the axis of the second shaft 15. Now, due to the runout, the contact of the cylindrical rollers 47 with the roller guide surfaces 13 will tend to change from a line-to-line contact to a point-to-point contact, so that the reaction force from the roller guide surfaces 13 to the cylindrical roller 47 is not applied uniformly but at one point as shown in FIG. 19 by arrow a. The point is away by a distance c from a plane b which is perpendicular to the axis of the trunnion 19' and includes the center of the spherical surface 41 on the trunnion. Thus, the ring 42 receives a turning torque tending to turn it around the axis including the center of the spherical surface and parallel to the axis of the tripod member, thus turning therearound by an angle $\beta$ to absorb the reaction force. The cylindrical roller 47 turns along the roller guide surfaces 13 which are flat.

What we claim is:

1. A homokinetic universal joint comprising:

a tripod member having three trunnions projecting radially and equally angularly spaced about its axis, each of said trunnions having an opposed pair of flat surfaces parallel to a plane perpendicular to the axis of said tripod member, said trunnions also having an opposed pair of cylindrical surfaces with an axis parallel to the axis of said tripod member;

an outer member formed with an inner surface having three track grooves, said track grooves extending axially and equally angularly spaced around an axis of said outer member, said tripod member being mounted in said outer member with said trunnions being received in respective track grooves in said outer member, said track grooves being formed with a pair of roller guide surfaces, said roller guide surfaces being flat and parallel to a plane including the axis of said outer member and a center of said track groove;

a cylindrical roller member mounted on each of said trunnions, said cylindrical roller being guided on said roller guide surfaces; and a ring interposed between said each cylindrical roller and said each trunnion, said ring being supported to be turnable around an axis which is perpendicular to the axis of said trunnion and parallel to the axis of said tripod member, said ring being formed with a square hole, wherein a rotation is transmitted between said outer member and said tripod member through said cylindrical roller.

2. A homokinetic universal joint comprising:

a tripod member having three trunnions projecting radially and equally angularly spaced about its axis, each of said trunnions having an opposed pair of flat surfaces parallel to a plane perpendicular to the axis of said tripod member, said trunnions also having an opposed pair of toroid surfaces with an axis parallel to the axis of said tripod member;

an outer member formed with an inner surface having three track grooves, said track grooves extending axially and equally angularly spaced around an axis of said outer member, said tripod member being mounted in said outer member with said trunnions being received in respective track grooves in said outer member, said track grooves being formed with a pair of roller guide surfaces, said roller guide surfaces being flat and parallel to a plane including the axis of said outer member and a center of said track groove;

a cylindrical roller member mounted on each of said trunnions, said cylindrical roller being guided on said roller guide surfaces; and a ring interposed between said each cylindrical roller and said each trunnion, said ring being supported to be turnable around an axis which is perpendicular to the axis of said trunnion and parallel to the axis of said tripod member, said ring having a hole formed with a cylindrical surface which is complementary with said toroid surface, wherein a rotation is transmitted between said outer member and said tripod member through said cylindrical roller.

3. a homokinetic universal joint comprising:

a tripod member having three trunnions projecting radially and equally angularly spaced about its axis, each of said trunnions having a spherical surface and an opposed pair of flat surfaces parallel to a plane perpendicular to the axis of said tripod member;

an outer member formed with an inner surface having three track grooves, said track grooves extending axially and equally angularly spaced around an axis of said outer member, said tripod member being mounted in said outer member with said trunnions being received in respective track grooves in said outer member, said track grooves being formed with a pair of roller guide surfaces, said roller guide surfaces being flat and parallel to a plane including the axis of said outer member and a center of said track groove;

a cylindrical roller member mounted on each of said trunnions, said cylindrical roller being guided on said roller guide surfaces; and a ring interposed between each said cylindrical roller and said each trunnion, said ring being supported to be turnable around an axis which is perpendicular to the axis of said trunnion and parallel to the axis of said tripod member, said ring having a hole formed with a pair of concave surfaces complementary with said spherical surface of said trunnion and a pair of flat surfaces, wherein a rotation is transmitted between said outer member and said tripod member through said cylindrical roller.

4. A homokinetic universal joint in any of claims 1, 2, or 3, further comprising a means for preventing said ring from moving in the direction of axis of said trunnion.

5. A homokinetic universal joint in any of claims 1, 2, or 3, further comprising a plurality of rolling members interposed between said ring and said cylindrical roller.

6. A homokinetic universal joint as claimed in claim 3, further comprising a retainer means having a pair of legs interposed between said flat surfaces on said trunnion and said flat surfaces on said hole of said ring.

* * * * *